2,957,823
PROCESS FOR ACIDIZING WELLS AND COMPOSITION THEREFOR

Jack Newcombe and Wayne S. Fallgatter, Tulsa, Okla., assignors to Cities Service Research and Development Company, New York, N.Y., a corporation of New Jersey No Drawing. Filed Feb. 6, 1957, Ser. No. 638,453

18 Claims. (Cl. 252—8.55)

This invention relates to a new and improved method and composition for acidizing oil bearing formations. More particularly, this invention relates to a new and improved acidizing composition uniquely adapted for treating calcareous formations containing water sensitive minerals.

The continuous depletion of oil sand properties has caused increased interest to be focused on the recovery of oil from formations previously bypassed due to the extreme difficulties faced in recovering oil therefrom. One particular type of formation falling within the foregoing category is that generally referred to as a limestone or calcareous formation containing hydratable silicates.

Such formations are rather extensive and are known to contain considerable quantities of oil. Very little success has been attained, however, in recovering oil from such formations by conventional treating methods. This is due primarily to the presence of highly hydratable silicates which often comprise as much as 10% of the total formation. Experience has shown that treatment of such formations according to conventional acidizing techniques often results in a reduction in permeability rather than in permeability increase such as would be expected when treating a normal limestone formation according to standard techniques. This is due to the fact that the water sensitive minerals, particularly the hydratable silicate, mingled with the carbonate in the formation swell considerably in volume when contacted with acid or other treating solutions. This increase in the volume of the silicates causes a reduction in permeability and consequently a reduction in oil recovery.

This condition could be overcome if means were available to control or preferably prevent silicate swelling during acid treatment. Several attempts have been made with varying degrees of success but no acidizing composition or acidizing process presently available is sufficiently effective in view of the costs to warrant widespread commercial adoption.

It is accordingly an object of the present invention to provide a new and improved method and composition for the treatment of calcareous formations containing hydratable silicates.

It is another object of the present invention to provide a new method of acidizing limestone formations which contain hydratable silicates in a manner that reduces and prevents silicate swelling during acidizing It is another object of the present invention to increase the recovery of oil from calcareous formations and simultaneously protect the equipment utilized in the acidizing process.

It is a still further object of this invention to provide an improved acidizing process which can be used in conjunction with secondary recovery methods such as in water flooding for increasing oil production from formations containing swellable silicates.

It has been suggested in U.S. 2,713,033 that the addition of tetraalkyl ammonium chloride to an acidizing solution will minimize swelling of silicates. Similarly U.S. 2,640,810 teaches that control of pH during acidizing of chalk will minimize the swelling of hydratable clays.

While the foregoing methods provide some control of silicate swelling, it has now been found that silicate swelling can be minimized and controlled far more effectively by means of the new and improved method and acid composition of the present invention.

It has been found that acidizing calcareous formations containing hydratable silicates according to the method of the present invention will provide permeability increases of 100 fold or more. In addition to providing control of silicate swelling during acidizing, the improved composition of this invention simultaneously provides substantial protection against the corrosive action of the acidizing solution on well tubing and associated equipment. In addition, the new acidizing solutions lower the interfacial tension of the oil and water present in the formation so that improved back-flow of the acid solution from the formation to the well is obtained.

The foregoing objects and advantages are accomplished according to the present invention by including in a hydrochloric acidizing solution a small amount of an acid soluble imidazoline having a molecular weight of from about 70 to 550. These imidazoline compounds unexpectedly provide a unique control of the swelling of silicates during acidizing.

The imidazoline is generally present in an amount of from 0.01 to about 2.0% by weight based on the total acid solution. Generally effective amounts of the imidazoline are from about 0.1% to 1.0%, a preferred amount being from about 0.4 to about 0.6%.

The aqueous solution of HCl will normally include from about 1 to 25% HCl. In conventional acidizing methods a 15% HCl solution is used. For purposes of the present invention, such a concentration of HCl is quite satisfactory. While hydrochloric acid is the preferred acid, other mineral acids such as nitric, hydrofluoric, hydrobromic, sulfuric or sulfamic acids may be used if desired.

While the presence of the imidazoline in the HCl solution adds greatly to the effectiveness of the HCl solution when treating formations containing hydratable silicates, an even greater improvement in acidizing with aqueous HCl can be obtained if there is combined with the HCl a low molecular weight monocarboxylic acid having from 1 to 5 carbon atoms. It has been found that adding to the solution of HCl and imidazoline an organic acid in an amount of from about 0.5 to 25% will provide even greater permeability increases when treating formations containing hydratable silicates. Generally effective amounts of the organic acid will be from about 5 to 20%. The improved result obtained by the presence of the organic acid is not easily explained, though it appears that the organic acid in some way enhances the effectiveness of the HCl without interfering or adversely affecting the anti-swelling characteristics of the solution provided by the imidazoline.

Suitable organic acids for this purpose are formic, acetic, propionic, butyric, and valeric acids. Other organic acids, such as the low molecular weight dicarboxylic acids could be used, but the limited solubility of the calcium salts of the formations in such acids limits their application to the present invention. The use of higher molecular weight organic acids is limited somewhat by cost but more particularly by their limited solubility in hydrochloric acid. Accordingly, low molecular weight acids having 5 carbon atoms or less are preferred.

The anti-swelling agents utilized are the acid soluble imidazolines having a molecular weight from about 70 to 550. These particular compounds when added to the acid solution provide unexpected but substantial reduction in silicate swelling. The effectiveness of these imidazoline compounds in providing the desired control of silicate swelling will be clearly demonstrated hereafter. The imidazoline compound is added to the HCl acid or the HCl and organic acid mixture in an amount of from about 0.01% to about 2% by weight of the total acid mixture. It has been found that increasing the amount of the imidazoline above 2% does not materially increase the efficiency of the acidizing solution in controlling silicate swelling. This effect may be attributed to an inhibiting of the action of the acid on the carbonate in the formation.

The imidazoline anti-swelling agent is generally represented by the following formula:

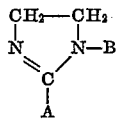

In the foregoing formula, A represents the residue of a monocarboxylic acid and may be hydrogen or an alkyl, cycloalkyl, alkenyl, aryl, alkylaryl, or arylalkyl group having from 1 to about 25 carbon atoms. The A groups may be substituted as for example with a hydroxyl radical, halogen or other constituents. B represents H,

or

These unique imidazoline anti-swelling agents corresponding to the foregoing formula are generally prepared by first reacting equimolar amounts of a polyamine with a monocarboxylic acid to form the imidazoline ring.

In preparing the imidazoline, the selected polyamine and monocarboxylic acid in equimolar amounts are reacted under conditions which effect a condensation reaction. To accomplish this, the reaction mixture is heated to a temperature of from about 105° C. to about 200° C. for a period from 1 to about 6 hours. The time will, of course, depend on the temperature at which the reaction mixture is refluxed. The water of condensation, which will amount to 2 mols when 1 mol of acid is reacted with 1 mol of amine, is distilled directly from the reaction of mixture or is removed by means of an azeotrope-forming solvent, such as benzene, toluene, xylene, or the like. If such a solvent is used, reflux is carried out at a temperature near the boiling point of the particular azeotrope-forming solvent used.

It has been found that the imidazoline compounds used in this invention can be improved under certain conditions by adding thereto limited amounts of an olefin oxide. The addition of from 0.5 to 5 mols of an olefin oxide, preferably ethylene oxide, to the final imidazoline compound will improve the solubility of the imidazoline in acid solution and increase the effectiveness as an anti-swelling agent.

Under certain circumstances, however, the addition of ethylene oxide may not be desirable if the addition decreases the effectiveness of the imidazoline compound in controlling silicate swelling. When the imidazoline is prepared from higher molecular weight amines and low molecular weight acids, ethylene oxide addition is not generally preferred. However, if low molecular weight amines are reacted with high molecular weight acids, the addition of ethylene oxide may be helpful. The position at which the ethylene oxide adds to the imidazoline has not been fully determined; however, it will be quite apparent that its presence generally adds to the effectiveness of the imidazoline in controlling clay swelling. This will be evident from Table I and the description which follows.

In preparing the imidazoline anti-swelling compound utilized in the acid solution, the preferred polyethyleneamines are ethylene diamine, diethylene triamine, triethylene tetramine, and tetraethylene pentamine.

The monocarboxylic acid used in preparing the imidazoline will be an acid having from 1 to 18 carbon atoms. The acid may be of saturated or unsaturated character and may be of straight, branched, or ring configuration. Substituted acids may be used. Among the monocarboxylic acids which can be used are: formic, acetic, acrylic, propionic, butyric, caproic, pelargonic, capric, undecoic, lauric, myristic, palmitic, linolenic, linoleic, oleic, ricinoleic, stearic, behenic, cerotic, benzoic, salicylic, glycolic, lactic, chloroacetic, and naphthenic acids.

To better understand the nature of the imidazoline anti-swelling agents and the manner of preparing the same, the following example is provided:

A total of 830 pounds (2.94 pound mols) of oleic acid was placed in a 220 gallon reaction kettle equipped with a stirrer and electric heater. Triethylene tetramine was added with stirring during a 30 minute period until 430 pounds (2.94 pound mols) had been added. The temperature of the reaction mixture was raised slowly with stirring over a 12 hour period until a temperature of 185° C. was reached. At this time 106 pounds of water (5.88 pound mols) had been removed from the reaction mass indicating the completion of the reaction to form the imidazoline compound. The imidazoline was transferred to a pressure reaction vessel and treated with ethylene oxide at a controlled temperature of 130–140° C. A total of 260 pounds (5.90 pound mols) was pumped into the reaction mixture over a 90 minute interval. At the completion of the reaction the product was cooled and drummed.

The final oxyethylated imidazoline compound is identified as compound Q in Table I.

In Table I, data is provided showing the comparative effectiveness of various imidazoline compounds in controlling the swelling of hydratable silicates. Table I is based on a series of tests carried out on 12-gram crushed samples of chalk formation containing approximately 0.7 gram of acid insoluble hydratable silicates. In conducting the test, like crushed samples were placed in graduated cylinders and treated with equal amounts of HCl. One acid solution used in treating had added thereto the indicated amount of the imidazoline. This was contrasted with a control sample of chalk of like amount treated with acid containing no anti-swelling agent. The column headed percent reduction in clay volume is based on a visual comparison between the volumes of hydratable clays present in the two cylinders.

It will be evident from the table below, that the imidazoline compounds in addition to minimizing clay swelling, possess important corrosion inhibiting properties which are most advantageous in minimizing the corrosive action of the acid solution. The corrosion inhibiting properties of these compounds are more fully described

TABLE I

| No. | Additive Conc., Percent | Additive Composition or Reaction | Mol Ratio | Nature of Soln. | Clay vol., cc. | Percent Reduction in Clay vol. | Percent Acid Inhibition at Additive Concns. of 100 p.p.m. |
|---|---|---|---|---|---|---|---|
| Control | | (15% HCl only) | | Clear | 18.5 | | |
| Com. A | 0.5 | | | Dispersion | 12 | 35 | 65.8 |
| Com. B | 0.5 | | | do | 10 | 46 | 40.6 |
| Control | | (15% HCl only) | | Clear | 18.5 | | |
| A | 0.5 | DETA* Butyric | 1:1 | do | 12 | 35 | |
| B | 0.5 | DETA Butyric Etoxide | 1:1:1 | do | 14.5 | 22 | |
| C | 0.5 | DETA Palmitic | 1:1 | Dispersion | 11 | 41 | |
| D | 0.5 | DETA Palmitic Etoxide | 1:1:1 | do | 13 | 40 | |
| E | 0.5 | DETA Stearic | 1:1 | do | 25 | (35 incr.) | |
| F | 0.5 | DETA Stearic Etoxide | 1:1:1 | do | 22.5 | (22 incr.) | |
| G | 0.5 | DETA Oleic | 1:1 | do | 8.5 | 54 | 96.2 |
| H | 0.5 | DETA Oleic Etoxide | 1:1:1 | do | 7.8 | 59 | 96.3 |
| I | 0.5 | TETA** Acetic Etoxide | 1:1:1 | Clear | 15 | 19 | 71.4 |
| Control | | (15% HCl only) | | do | 18.5 | | |
| J | 0.5 | TETA Butyric | 1:1 | do | 12.5 | 32 | 88.6 |
| K | 0.5 | TETA Butyric Etoxide | 1:1:1 | do | 12.5 | 32 | 94.4 |
| L | 0.5 | TETA Palmitic | 1:1 | Dispersion | 10.5 | 43 | |
| M | 0.5 | TETA Palmitic Etoxide | 1:1:1 | Slight Haze | 10 | 46 | |
| N | 0.5 | TETA Stearic | 1:1 | Dispersion | 26 | (41 incr.) | 91.3 |
| O | 0.5 | TETA Stearic Etoxide | 1:1:1 | do | 11 | 41 | 95.6 |
| P | 0.5 | TETA Oleic | 1:1 | do | 11 | 41 | 80.0 |
| Q | 0.5 | TETA Oleic Etoxide | 1:1:2 | Clear | 9.8 | 47 | 97.2 |
| R | 0.1 | do | 1:1:2 | do | 15 | 21 | 97.2 |
| S | 0.3 | do | 1:1:2 | do | 10 | 47 | 97.2 |
| T | 1.0 | do | 1:1:2 | do | 9.7 | 49 | 97.2 |
| Control | | (15% HCl only) | | do | 18.5 | | |
| U | 0.5 | TEPA*** Butyric | 1:1 | Clear | 14.5 | 22 | |
| V | 0.5 | TEPA*** Etoxide | 1:1:1 | do | 13.5 | 27 | |
| W | 0.5 | TEPA Palmitic | 1:1 | Dispersion | 10.5 | 43 | 96.9 |
| X | 0.5 | TEPA Palmitic Etoxide | 1:1:1 | Clear | 9.0 | 51 | 96.3 |
| Y | 0.5 | TEPA Stearic | 1:1 | Dispersion | 13.5 | 27 | |
| Z | 0.5 | TEPA Stearic Etoxide | 1:1:1 | do | 13.5 | 27 | |
| a¹ | 0.5 | TEPA Oleic | 1:1 | Slight Dispersion | 9.8 | 47 | 97.5 |
| b¹ | 0.5 | TEPA Oleic Etoxide | 1:1:1 | Clear | 10.0 | 46 | 97.0 |

*Diethylene triamine.
**Triethylene tetramine.
***Tetraethylene pentamine.

in copending application Ser. No. 562,638, filed February 2, 1956.

The presence of the imidazoline in the HCl acid solution is important in addition to controlling swelling of the silicate and providing protection against the corrosive action of the acid, in reducing the oil-water interfacial tension in the formation as previously indicated. This characteristic of the acid solutions of this invention provided by the imidazoline compounds is most important. Normally in conventional acidizing procedures, spent acid is often held in the formation by capillary forces. This action inhibits the flow of spent acid and oil to the well bore after treatment. If the oil-water interfacial tension is sufficiently low, the spent acid will flow back into the well more readily, thus permitting easier flow of oil to the well.

The acid solution of the present invention can be broadly defined as follows:

| | Weight percent |
|---|---|
| HCl | 1–25 |
| Imidazoline (acid sol. mol. wt. 70–550) | 0.01–2.0 |

When the organic acid is used, the acid solution will have the following composition:

| | Weight percent |
|---|---|
| HCl | 1–25 |
| Organic acid (1–5 carbon) | 0.5–25 |
| Imidazoline (acid sol. mol. wt. 70–550) | 0.01–2.0 |

Typical examples of suitable acid compositions with and without the organic acid follow:

Example 1

| | Weight percent |
|---|---|
| Hydrochloric acid | 15 |
| TETA, oleic acid, ethylene oxide (1:1:2), comp. Q | 1.0 |

Example 2

| | |
|---|---|
| Hydrochloric acid | 10 |
| TETA, butyric acid (1:1), comp. J | 0.3 |

Example 3

| | |
|---|---|
| Hydrochloric acid | 10.5 |
| Propionic acid | 10.9 |
| TEPA, palmitic acid, ethylene oxide (1:1:1), comp. X | 1.0 |

Example 4

| | |
|---|---|
| Hydrochloric acid | 12.75 |
| Acetic acid | 2.9 |
| Butyric acid | 2.2 |
| TETA, oleic acid, ethylene oxide (1:1:2), comp. Q | 0.5 |

Example 4A

| | |
|---|---|
| Hydrochloric acid | 12.5 |
| Acetic acid | 8.8 |
| TETA, oleic acid, ethylene oxide (1:1:2), comp. Q | 0.5 |

Example 5

| | |
|---|---|
| Hydrochloric acid | 10.5 |
| Acetic acid | 7.4 |
| Valeric acid | 2.5 |
| DETA, butyric acid (1:1), comp. A | 1.0 |

Example 6

| | |
|---|---|
| Hydrochloric acid | 12.5 |
| Formic acid | 2.2 |
| TETA, oleic acid, ethylene oxide (1:1:2), comp. Q | 0.2 |

Example 7

| | |
|---|---|
| Hydrochloric acid | 10.5 |
| Butyric acid | 5.5 |
| DETA, stearic acid, ethylene oxide (1:1:1), comp. F | 2.0 |

To test the effectiveness of the acid solutions of this invention acidizing tests were carried out on cores obtained from a formation containing approximately 5.84% hydratable silicates. The cores tested were obtained from a formation having the following characteristics:

CORE SUMMARY—R. FEE—WELL A

| | |
|---|---|
| Depth, feet | 1391.0–1521.0 |
| Percent core recovery | 100 |
| Feet of permeable, productive formation recovered | 69.0 |
| Average permeability, millidarcies | 0.2 |
| Average porosity, percent | 27.7 |
| Average residual oil saturation, percent pore space | 31.4 |
| Gravity of oil, °API | 42.0 |
| Average total water saturation, percent pore space | 41.8 |
| Average calculated connate water saturation, percent pore space | 31.0 |
| Solution gas-oil ratio [1], cu. ft./bbl | 100.0 |
| Formation volume factor* | 1.10 |

[1] Determined by reduction in pressure from estimated saturation pressure to atm. pressure.

The results of the tests carried out on the cores obtained from the above formation are shown in table II which follows. The tests were carried out on cores having a length of 2.25 cm. and a diameter of 1.9 cm. Each test core prior to acidizing was air-dried for 2 to 3 weeks and saturated with water and driven with kerosene to irreducible water saturation prior to acidizing. The acidizing was carried out on the individual cores with the acidizing composition identified. Each test core was first acidized with the solution indicated at 200 p.s.i. for ten minutes, 400 p.s.i. for ten minutes, 600 p.s.i. for ten minutes and thereafter at 1000 p.s.i. until acid breakthrough.

The effectiveness of the particular composition identified can be determined by reference to the breakthrough time and to the acid rating value. This acid rating value is based on the following expression:

$$\text{Acid rating} = \frac{L}{(B.T.)(Kw)(V)}$$

wherein L is the length of the core in centimeters; B.T., the time in minutes required for breakthrough of acid; $Kw$, the water permeability in millidarcies; and V, the volume of the fluid produced through the core at the time of acid breakthrough. The higher the acid rating, the more effective the particular acidizing solution is. It is, of course, to be understood that the composition of each core varies considerably even if obtained from the same formation at the same depth. This, of course, makes an absolute comparison between acid solution very difficult;

TABLE II

| Test No. | Core Number | Weight Percent Anti-Swell Agent | Weight Percent Hydrochloric | Weight Percent Organic | Perm., Md.[1] | B.T.[2] Min. | Acid Rating |
|---|---|---|---|---|---|---|---|
| 1 | 113–7a | 0 | 15.0 | 0 | 0.0741 | 355 | 0.016 |
| 2 | 135–1 | 0 | 15.0 | 0 | 0.0320 | 480 | 0.02 |
| 3 | 151–4b | 0 | 10.5 | 6.7 Formic | 0.164 | 38.5 | 0.27 |
| 4 | 131–11a | 0 | 10.5 | 8.8 Acetic | 0.0546 | 74 | 0.24 |
| 5 | 135–36 | 0 | 7.5 | 14.7 Acetic | 0.0464 | 62.6 | 0.43 |
| 6 | 110–1c | 0 | 10.5 | 10.9 Propionic | 0.0816 | 57.5 | 0.34 |
| 7 | 110–2a | 0 | 12.0 | 8.6 Butyric | 0.0942 | 68.4 | 0.23 |
| 8 | 113–7b | 0.5Q | 15.0 | 0 | 0.0569 | 120.9 | 0.19 |
| 9 | 134–2a | 1.0Q | 15.0 | 0 | 0.0245 | 144 | 0.29 |
| 10 | 151–4a | 0.5Q | 10.5 | 6.7 Formic | 0.164 | 30.4 | 0.45 |
| 11 | 133–3a | 0.5Q | 10.5 | 6.7 Formic | 0.0723 | 45.6 | 0.49 |
| 12 | 131–5b | 0.5Q | 10.5 | 8.8 Acetic | 0.0537 | 40.2 | 0.95 |
| 13 | 133–3b | 0.5Q | 10.5 | 8.8 Acetic | 0.0633 | 33.6 | 1.32 |
| 14 | 135–6a | 0.5Q | 7.5 | 14.7 Acetic | 0.0426 | 46.5 | 1.35 |
| 15 | 131–4 | 0.5X | 10.5 | 8.8 Acetic | 0.0267 | 60.8 | 1.26 |
| 16 | 131–8 | 0.5H | 10.5 | 8.8 Acetic | 0.0627 | 31.7 | 1.42 |
| 17 | 110–2b | 0.5Q | 10.5 | 10.9 Propionic | 0.0771 | 35.5 | 1.09 |
| 18 | 115–33 | 0.5Q | 12.0 | 8.5 Butyric | 0.0161 | 65.0 | 1.91 |
| 19 | 113–7b | 0.5Q | 12.7 | 2.9 Acetic / 2.2 Butyric | 0.0496 | 36.2 | 1.51 |
| 20 | 113–6 | 0.5Q | 10.5 | 7.4 Acetic / 2.5 Valeric | 0.0744 | 45.4 | 0.63 |

[1] Permeability before acidizing in millidarcies.
[2] Breakthrough time in minutes.

however, it will be quite evident that the acid solutions of the present invention having incorporated therein an imidazoline, are superior to HCl alone, or HCl and a selected organic acid, in increasing permeability by the control of silicate swelling they provide.

Referring now to Table II it will be quite apparent that the imidazoline anti-silicate swelling agents impart superior acidizing properties to acid solutions consisting of hydrochloric acid and/or mixtures of hydrochloric acid with low molecular weight organic acids. For example, compare the results of tests 1 and 2 in which cores were acidized with hydrochloric acid containing no agent with tests 8 and 9 in which 0.5% and 1.0% of anti-swell agent Q was used with hydrochloric acid. Tests 8 and 9 averaged 1200% superior to tests 1 and 2. Compare the results of test 3 with tests 10 and 11. Tests 10 and 11 made using 0.5% agent Q in a hydrochloric acid-formic acid composition was 75% improved over test 3 in which a hydrochloric acid-formic acid composition containing no agent was used. Also compare the results of tests 12 and 13 using agent Q with a hydrochloric acid-acetic acid mixture which are 370% superior to the results of test 4 made using the same acid mixture but with no anti-swell agent. Similar or superior results will be noted on comparing test 4 with tests 15 and 16, test 5 with test 14, test 6 with test 17, test 7 with test 18, and tests 4 and 7 with test 19.

In utilizing the acid compositions of the present invention, in treating formations containing hydratable silicates normal or conventional acidizing techniques will be used. The amount of acid solution will, of course, depend generally on the characteristics of the particular formation, the area to be treated and the desired increase in permeability.

In conventional acidizing techniques, the acid solution is introduced into the formation through the well tubing so as to come in contact with the formation to be treated. The acid solution may be introduced in single batch or in a series of slugs followed by a backing solution of oil or brine to insure contact of the acid with the formation. After a sufficient time has elapsed to spend the acid solution, the flush oil is pumped from the well and spent acid permitted to back flow into the well. After the spent acid has moved out of the formation it may be pumped from the well. If substantial increases in permeability are contemplated, it may be necessary to carry out repeated treatments of the formation. The acidizing compositions of the present solution can, of course, be used directly upon completion of a well, or on previously fractured or acidized wells, or they may be used in conjunction with secondary recovery processes, such as in water flooding.

To further illustrate the effectiveness of our imidazoline agent the results from a field application of the agent in an acidizing composition are given below. An acidizing job was performed on a well in the formation described previously as the source of laboratory test cores used for the tests of Table II. The well was originally drilled and completed by fracturing with sand and oil. Within five months after completion oil production from the well had declined to less than 10 barrels per day. At the time the well was acidized some 18 months after drilling, it was producing only 4 barrels of oil per day. This is typical of the oil production from wells completed in this formation. The well was acidized with 5,000 gallons of the acid composition of Example No. 4A. The results of oil production for the first 6 months after acidizing are as follows:

| Period of time: | Oil production in barrels per day |
|---|---|
| Before acidizing | 4.0 |
| First month | 13.4 |
| Second month | 9.2 |
| Third month | 8.4 |
| Fourth month | 8.5 |
| Fifth month | 8.0 |
| Sixth month | 7.5 |

Similar wells that have been acidized with conventional hydrochloric acid have actually declined in oil production after acidizing.

While certain preferred embodiments of the invention have been described, it is to be understood that such description is not intended to limit the scope of this invention in any particular. The only limitations intended are those imposed by the claims appended thereto.

We claim:

1. A well treating composition comprising an aqueous solution containing from 1 to about 25% HCl from 0.01 to 2% of an acid soluble imidazoline, except the imidazoline prepared by reacting diethylene triamine and stearic acid, having a molecular weight from 70 to 550 and from 0.5 to 25% of an aliphatic monocarboxylic acid having from 1 to 5 carbon atoms.

2. A well treating composition comprising an aqueous solution containing from 1 to 25% of HCl about 0.5% of an acid soluble imidazoline, except the imidazoline prepared by reacting diethylene triamine and stearic acid, having a molecular weight from 70 to 550 and from 0.5 to 25% of an aliphatic monocarboxylic acid having from 1 to 5 carbon atoms.

3. A well treating composition comprising an aqueous solution containing from 1 to 25% HCl, from 0.01 to 2% of an acid soluble imidazoline, except the imidazoline prepared by reacting diethylene triamine and stearic acid having a molecular weight from 70 to 550 oxyethylated with from 0.5 to about 5 mols of ethylene oxide and from 0.5 to 25% of an aliphatic monocarboxylic acid having from 1 to 5 carbon atoms.

4. The well treating composition of claim 1, wherein the aliphatic monocarboxylic acid is formic acid.

5. The well treating composition of claim 1 wherein the aliphatic monocarboxylic acid is acetic acid.

6. The well treating composition of claim 1 wherein the aliphatic monocarboxylic acid is propionic acid.

7. The well treating composition of claim 1 wherein the aliphatic monocarboxylic acid is butyric acid.

8. A well treating composition as claimed in claim 1, wherein the aliphatic monocarboxylic acid is valeric acid.

9. The well treating composition of claim 3 wherein in the imidazoline is oxyethylated with 2 mols of ethylene oxide.

10. A well treating composition comprising an aqueous solution containing about 15% HCl, about 15% butyric acid, and from 0.01 to 2% of an acid soluble imidazoline, except the imidazoline prepared by reacting diethylene triamine and stearic acid, having a molecular weight of from 70 to 550.

11. The well treating composition of claim 10 wherein the imidazoline is oxyethylated with from 0.5 to 5 mols of ethylene oxide.

12. A process for acidizing a calcareous oil bearing formation containing hydratable silicates which comprises introducing into the formation an aqueous hydrochloric acid solution containing from 1 to 25% of HCl, from 0.01 to about 2% of an acid soluble imidazoline, except the imidazoline prepared by reacting diethylene triamine and stearic acid, having a molecular weight of from 70 to 550 and from 0.5 to 25% of an aliphatic monocarboxylic acid having from 1 to 5 carbon atoms.

13. A process for acidizing a calcareous oil bearing formation containing hydratable silicates as claimed in claim 12 wherein the imidazoline is oxyethylated with from 0.5 to 5 mols of ethylene oxide.

14. A process for acidizing a calcareous oil bearing formation containing hydratable silicates as claimed in claim 12 in which the aliphatic monocarboxylic acid is formic.

15. A process for acidizing a calcareous oil bearing formation containing hydratable silicates as claimed in claim 13 wherein the imidazoline is oxyethylated with 2 mols of ethylene oxides.

16. A process for acidizing a calcareous oil bearing formation containing hydratable silicates which comprises introducing into the formation an aqueous solution containing about 15% hydrochloric acid, about 10.9% propionic acid and from 0.1 to 1% of an acid soluble imidazoline, except the imidazoline prepared by reacting diethylene triamine and stearic acid, having a molecular weight of from 70 to 550.

17. A process for acidizing a calcareous oil bearing formation containing hydratable silicates which comprises introducing into the formation an aqueous solution containing about 10.5% hydrochloric acid, about 6.7% formic acid and 0.5% of imidazoline prepared by reacting triethylene tetramine with oleic acid in a molar ratio of 1:1 and treating the product obtained with two mols of ethylene oxide.

18. A process for acidizing a calcareous oil bearing formation containing hydratable silicates which comprises introducing into the formation an aqueous solution containing about 10.5% hydrochloric acid, about 8.8% acetic acid and 0.5% of imidazoline prepared by reacting diethylene triamine with oleic acid in a molar ratio of 1:1 with the product being treated with one mol of ethylene oxide.

References Cited in the file of this patent

UNITED STATES PATENTS

| | | |
|---|---|---|
| 2,292,208 | De Groote et al. | Aug. 4, 1942 |
| 2,301,875 | Holmes | Nov. 10, 1942 |
| 2,400,395 | De Groote et al. | May 14, 1946 |
| 2,468,163 | Blair et al. | Apr. 26, 1949 |
| 2,640,810 | Cardwell et al. | Jan. 2, 1953 |
| 2,646,399 | Hughes | July 21, 1953 |
| 2,713,033 | Cardwell et al. | July 12, 1955 |
| 2,761,836 | Brown et al. | Sept. 4, 1956 |

UNITED STATES PATENT OFFICE

CERTIFICATION OF CORRECTION

Patent No. 2,957,823            October 25, 1960

Jack Newcombe et al.

It is hereby certified that error appears in the above numbered patent requiring correction and that the said Letters Patent should read as corrected below.

Column 7, line 11, Example 5, for "1.0" read -- 0.1 --; line 71, for "factor*" read -- factor$^1$ --; column 9, line 63, for "thereto" read -- hereto --; column 10, line 23, strike out "in".

Signed and sealed this 9th day of May 1961.

(SEAL)
Attest:

ERNEST W. SWIDER            DAVID L. LADD
Attesting Officer            Commissioner of Patents